Feb. 28, 1967 W. G. HARRISON ETAL 3,306,428
CODING DEVICES FOR CONVEYORS
Filed May 6, 1964 2 Sheets-Sheet 1
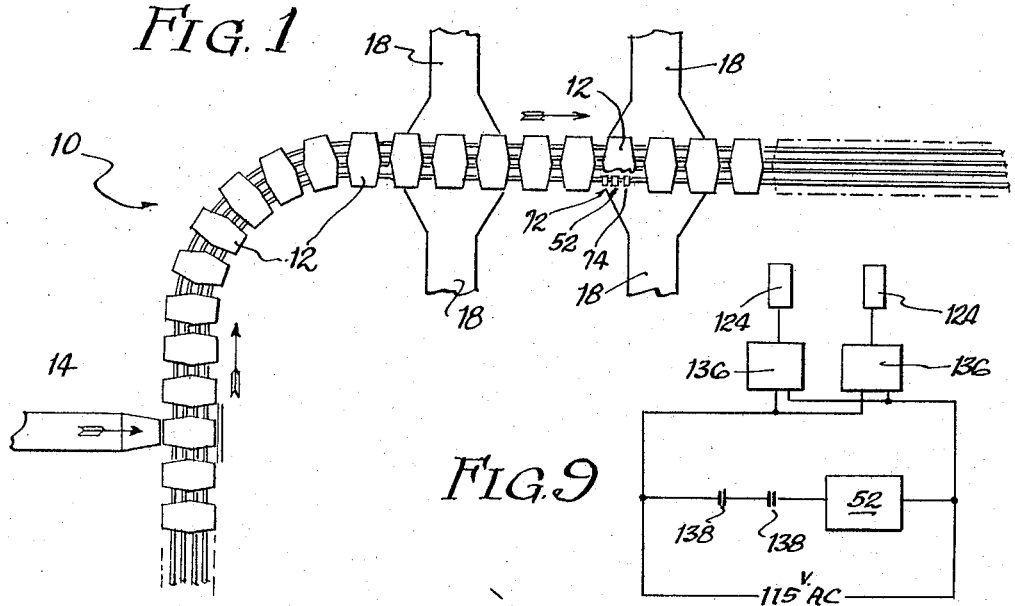
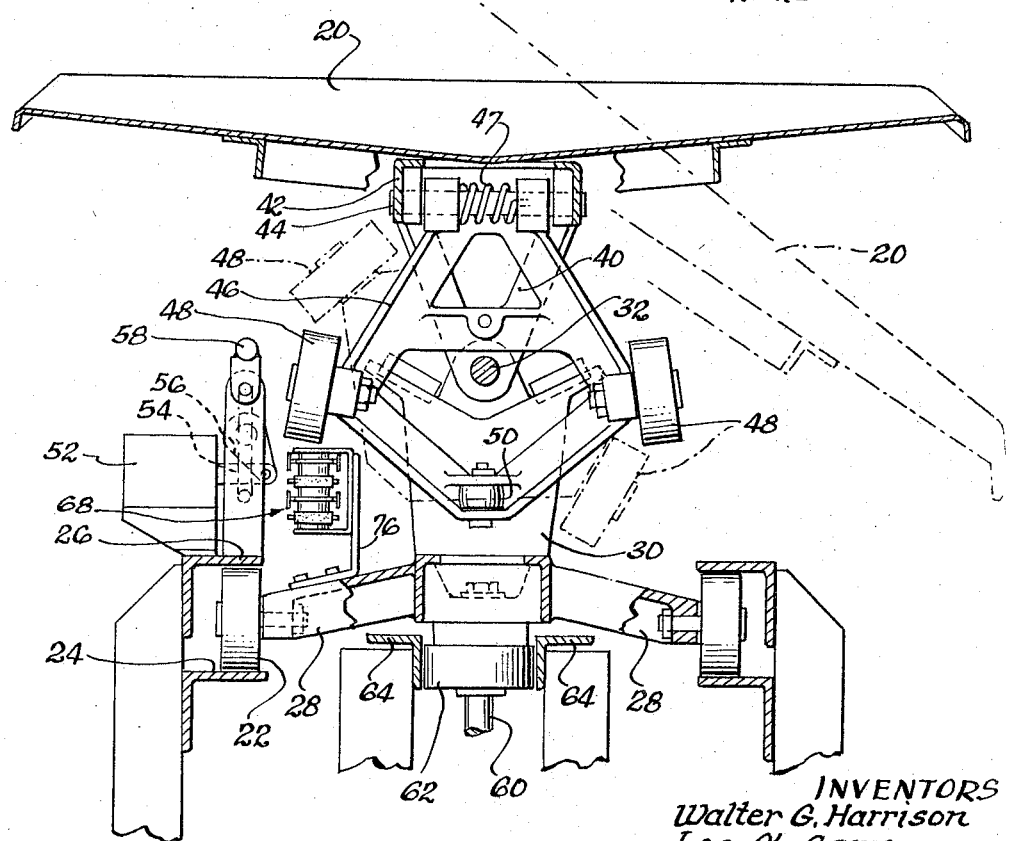
INVENTORS
Walter G. Harrison
Leo A. Gary
Allan C. Audet
By McDougall, Hersh & Scott
Att'ys

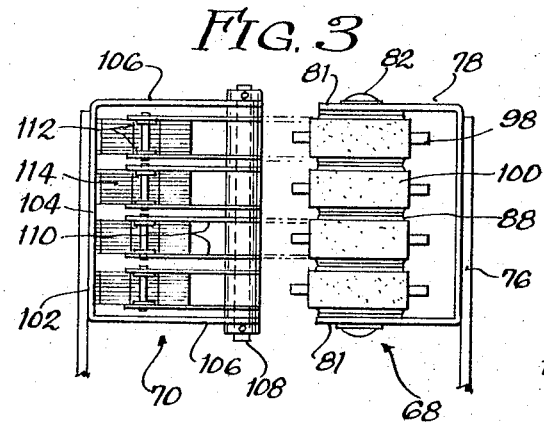
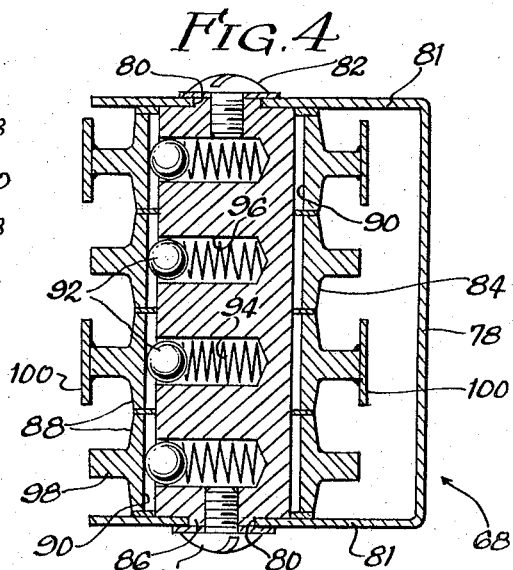
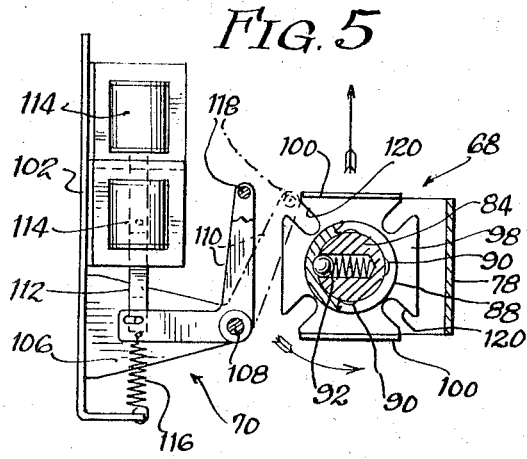
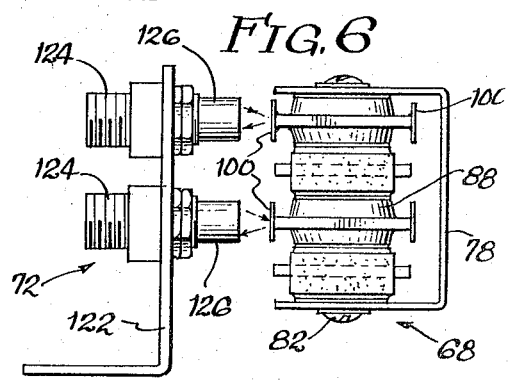
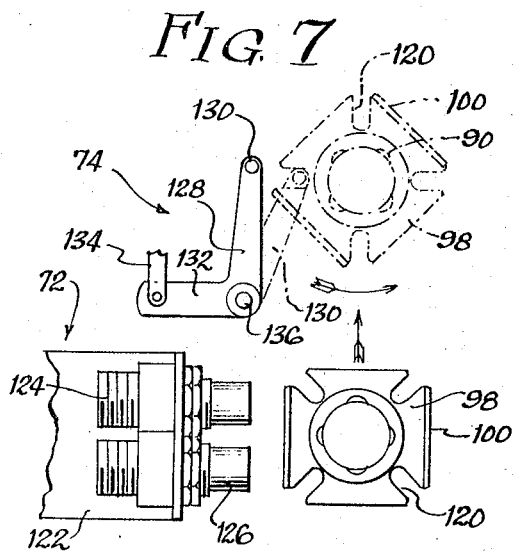
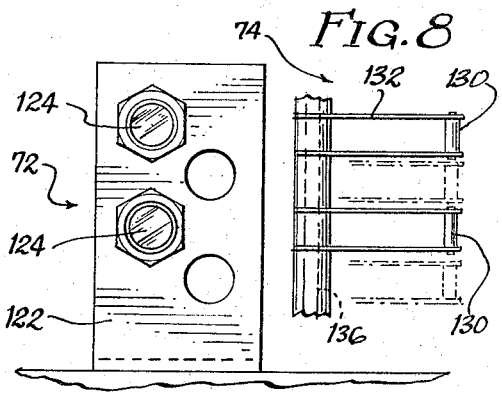

United States Patent Office 3,306,428
Patented Feb. 28, 1967

3,306,428
CODING DEVICES FOR CONVEYORS
Walter G. Harrison, Westchester, Leo A. Gary, Chicago, and Allan C. Audet, Arlington Heights, Ill., assignors to The Spra-Con Company, Chicago, Ill., a corporation of Illinois
Filed May 6, 1964, Ser. No. 365,360
4 Claims. (Cl. 198—38)

This invention relates to conveyors of the type used for transporting articles along a predetermined path. In particular, the invention is concerned with conveyors of the type including mechanisms adapted to discharge articles in accordance with prearranged conditions.

There are various known conveyor constructions which provide for the transportation of articles of various configurations. For example, in copending application Serial No. 81,754, filed January 10, 1961, now Patent No. 3,167,192, there are described tray constructions adapted to be included in a conveyor system. Each of the trays includes mounting means permitting the trays to be pivoted while they are moving along a conveyor path. As described in this application, electrical means, such as solenoids, are operated to move cam elements into the path of movement of the trays. Engagement of means carried by the trays with the cam elements results in the desired pivoting movement.

Actuation of the electrical devices or other means for pivoting conveyor units is preferably carried out in an automatic fashion. Thus, various permanent discharge chutes are usually located along a conveyor path. The actuation of the means for tilting the trays for discharge of articles into a particular chute is ideally accomplished in response to the arriving of the tray at the desired location.

Previous systems capable of achieving automatic discharge from conveyors have been proposed. Such systems are disclosed in the aforementioned copending application and are referred to in Speaker Patent No. 3,034,665. Such systems preferably comprise coding devices which are operated when an article is disposed on a particular tray. The coding devices are capable of synchronization with the tray movement whereby an electrical signal will be generated when the tray reaches a location corresponding to a particular code. This electrical signal can then be utilized for actuation of the mechanisms which are adapted to tilt the tray.

It is an object of this invention to provide an improved means for accomplishing automatic discharge of articles from a conveyor system.

It is a further object of this invention to provide improved means for use in combination with conveyors adapted to discharge articles at different locations, which means are relatively economical in nature and relatively simple to operate and maintain.

It is a further object of this invention to provide means of the type described which comprise coding devices adapted to be coded at the time an article is placed on a conveyor whereby the article can be automatically discharged at a location along the path of the conveyor which corresponds with the particular code assigned to the article.

These and other objects of this invention will appear hereinafter and for purposes of illustration but not of limitation, specific embodiments of this invention are shown in the accompanying drawings in which:

FIGURE 1 is a fragmentary schematic illustration of a conveyor apparatus suitable for use in combination with the coding devices of this invention;

FIGURE 2 is a vertical elevational view, partly in section, illustrating a conveyor tray having the coding device of this invention associated therewith;

FIGURE 3 is a detail elevational view of the coding device of this invention and of mechanisms for setting a particular code on the device;

FIGURE 4 is an enlarged cross-sectional view of the coding device;

FIGURE 5 is an end view, partly in section, of the combination shown in FIGURE 3;

FIGURE 6 is a detail elevational view of the coding device as it appears opposite photosensitive means used for reading code combinations;

FIGURE 7 is a detail view illustrating the means for resetting the coding device;

FIGURE 8 is a rear elevational view illustrating the photosensitive means and resetting means; and, FIGURE 9 is a diagrammatic illustration of a typical circuit utilized for energizing the mechanisms which are operable for discharging articles from a conveyor.

The apparatus of this invention is directed to conveyor systems which include a plurality of carriage means for transporting articles along a predetermined path. The invention is directed to coding devices which work in conjunction with discharge means associated with the carriage means. It will be understood that where reference is made to carriage means and discharge means, various types of constructions are contemplated. The carriage means may comprise individual trays as disclosed in the aforementioned copending application or a continuous bed conveyor could also be adapted for the purposes of this invention. The means for discharging the articles may involve tilting of the carriage means as in the copending application but other action imparted to the carriage means or to the articles is also contemplated. Finally, constructions of the type disclosed in copending application Serial No. 365,361, entitled "Tiltable Conveyor Apparatus," and filed May 6, 1964, now Patent No. 3,231,066, are clearly suited for incorporation of the features of this invention.

The coding devices of this invention include code retaining members which are associated with individual carriage means or with specific areas of a conveyor. The code retaining means thus travel with the conveyor, and code reading devices are located along the path of movement of the conveyor whereby the retaining means can be read by the reading devices at an appropriate time. When a particular combination of code reading devices reads a proper combination of code retaining means, mechanisms will be operated for causing discharge of articles from the conveyor.

In accordance with this invention, discharge of articles is effected by first setting the code retaining means at the time the articles are deposited on the conveyor. The code retaining means are then moved along with the conveyor until the location for discharge of the article is reached. The code reading devices at this location are set in a manner corresponding to the particular setting of the code retaining means. Accordingly, discharge operations can be caused to take place only at one particular location since there will be no other location which will have code reading means having the precise setting.

In the embodiment of the invention to be described, the code retaining means comprise light reflecting members which are adapted to be set in a number of different patterns. Photosensitive means, situated in a like number of different patterns, are provided at each discharge location. When light is reflected from the light reflecting means to all of the photosensitive means at a particular location, the discharge mechanisms will be caused to operate. In considering the specific embodiments described herein, it will be understood that other coding means capable of being operated through the use of the mechanisms of this invention could also be employed.

FIGURE 1 illustrates a segment of a conveyor apparatus 10 which includes a plurality of individual trays 12. A loading mechanism 14 is adapted to move articles onto the trays 12 and the trays are then transported along the path defined by the tracks 16. Discharge chutes 18 are situated on either side of the tracks so that articles moved onto the conveyor can be sorted in accordance with a prearranged design. The particular construction shown involves the use of trays 12 which can tilt in either direction for discharging articles. The concepts of this invention could, however, be utilized with conveyors which discharge in any one direction.

FIGURE 2 illustrates the manner in which concepts of this invention can be embodied along with a known tray construction. The illustrated tray 20 as well as the mounting means therefor is disclosed in Patent No. 3,167,192. The construction includes wheels 22 which ride between tracks 24 and 26. These wheels are mounted on leg members 28 on standard 30. A pivot pin 32 is provided for pivotally carrying the tray support member 30. The member 40 comprises a V-shaped member which is connected to the bracket 42 secured to the underside of the tray. A pin 44 which extends through this bracket also supports member 46, this member being normally urged toward the member 40 by means of spring 47. The member 46 carries wheels 48 which extend outwardly from the two sides thereof. A roller 50 is mounted at the lower end of the member 46, and this roller along with the spring 47 provides for a locking action of the trays, this action not forming a part of this invention.

Mounted on one of the tracks 26 is a solenoid 52 having an actuating member 54. The member 54 is connected to the arm 56 which is connected to cam member 58. As explained in the aforementioned copending application, energization of the solenoid 52 will result in pivoting of the cam member 58 into the path of the wheel 48. As the wheel rides on the cam member, the tray 20 is tilted to the dotted line position for discharge of an article.

Driving movement of the trays can be effected by means of a chain drive connected to rod 60. This rod is attached to the standard 30, and a wheel 62 riding between tracks permits smooth driving operation.

FIGURES 3 through 8 illustrate in detail the coding device which is included in the control means of this invention. The coding device comprises a first portion 68 which defines light reflecting members. FIGURES 3 and 5 illustrate a second portion 70 comprising a mechanism for setting the light reflecting members in accordance with a desired pattern. FIGURES 6, 7 and 8 illustrate a third portion 72 which comprises photosensitive means adapted to actuate discharge mechanisms when a specific pattern is displayed by the light reflecting means. A fourth portion 74 of the mechanism of this invention is illustrated in FIGURES 7 and 8. This portion comprises means for restoring the light reflecting means to a nonreflecting portion whereby different codes can be assigned during the next cycle of movement of the conveyor.

As shown in FIGURE 2, the portion 68 carrying the light reflecting means can be attached to a leg 28 of the standard 30 by means of bracket 76. Accordingly, this portion of the device will be carried by each conveyor tray to provide for operation of the conveyor at a desired time.

Referring to FIGURES 3 and 4, it will be noted that the portion 68 comprises a U-shaped member 78 defining openings 80 in each leg 81. Screws 82 hold a core member 84 in a stationary position between the legs 81. At least one neck portion 86 of the core may be square to fit into a corresponding opening 80 whereby the core will not rotate relative to the U-shaped member.

A plurality of sleeve members 88 are rotatably positioned about the core 84. These sleeve members preferably define recesses 90 (see FIGURE 5) whereby balls 92 will engage the recesses when the sleeves rotate. This arrangement permits consistent positioning of the sleeves when they are rotated during operation of the coding device. The balls 92 are normally urged into these recesses by means of springs 94 included in bores 96 defined by the core 84. In the embodiment illustrated, four recesses 90 are defined by each sleeve whereby rotation through 90° will occur during each phase of operation of the coding devices.

Each of the sleeves 88 defines four outwardly extending arms 98. On two diametrically opposed arms, there are provided light reflecting members 100. The other arms 98 are non-reflecting, and it will therefore be apparent that rotation of a sleeve 88 through 90° will shift the sleeve from a reflecting to a non-reflecting position or vice versa.

FIGURES 3 and 5 illustrate a suitable means for shifting the sleeves 88 to reflecting positions. The means illustrated comprises a mounting bracket 102 which carries a U-shaped plate member 104 having outwardly extending arms 106. A shaft 108 is mounted between these arms and lever arms 110 are pivotally mounted on this shaft. One end of each lever 110 is connected to a core extension 112 of a solenoid 114. Individual solenoids are provided for each lever whereby the respective levers can be selectively pivoted depending on the solenoid energized. A spring 116 normally maintains the levers 110 in the solid line position shown in FIGURE 5 so that when a core 112 is pulled in, the levers are pivoted to the dotted line position in opposition to the action of this spring.

The portion 70 just described is located in a stationary position whereby relative movement will be achieved between this portion and the portions 68 carried by the conveyor. If one of the levers 110 is pivoted to the dotted line position, the end of the lever will move into the path of movement of the arms 98 carrying the light reflecting members. The pins 118 carried by the levers 110 are adapted to fit into the recesses 120 defined between adjacent arms. It will be apparent that when the portion 68 is moving in the direction of the arrow shown in FIGURE 5, engagement of the pin 118 with the recess 120 will cause the sleeve 88 to rotate through 90°. Accordingly, a light reflecting surface 100 will be shifted to the reading position. Since an individual solenoid is provided for each lever 110, any combination of the sleeves can be rotated to light reflecting position.

In the embodiment illustrated, four sleeves 88 are included, however, it will be apparent that this number could be increased or decreased, depending on the number of code combination desired. Furthermore, it is not necessary that a full 90° rotation be required since the mechanisms could be employed for imparting a lesser rotation in which case a greater number of light reflecting means and alternately nonreflecting areas would be provided on each sleeve. On the other hand, mechanisms imparting a full 180° rotation would also fall within the spirit of this invention.

The portion 72 comprising the reading means of the invention includes a mounting bracket 122 carrying photosensitive means 124. In the embodiment shown, the photosensitive means comprise a combination of light transmitting and light sensitive features. The dotted lines between the heads 126 of the photosensitive means and the members 100 depict a suitable action wherein light is directed toward the reflecting means from one area of the head and then reflected back to a separate area of the head. Suitable devices of this type comprise miniature photoelectric scanners produced by Farmer Electric Products Company, Inc., Natick, Massachusetts. The members 100 may be formed by providing them with a conventional metallized paint.

The portion 72 of the control means of this invention are located in stationary positions along the conveyor path. Preferably, they are located in the area of a discharge chute 18 whereby immediate operations can be undertaken for effecting a discharge operation when a proper code is detected. In the illustration of FIGURE 6, two of the photosensitive means are mounted on the bracket 122, and each of these means is in proper position for detecting reflected light from the members 100. It will be apparent that if one of the members 100 were not in the position shown, then one of the photosensitive means would not detect reflected light. With each photosensitive means included in an actuating circuit for the discharge mechanisms, it will be obvious that actuation of the discharge mechanisms would not occur. Accordingly, proper correspondence of the reflecting means and photosensitive means is necessary to achieve discharge at a particular location.

FIGURES 7 and 8 illustrate a further portion of the control means comprising a resetting mechanism 74. This mechanism includes a lever 128 initially corresponding to the lever 110. A pin 130 on one lever arm is adapted to fit into recesses 120 whereby a sleeve can be rotated from a reflecting to a nonreflecting position. As shown by the dotted lines in FIGURE 7, the lever 128 is pivoted in a manner corresponding to the pivoting of the lever 110.

In accordance with a preferred form of this invention, the arm 132 of the lever 128 is attached to a link 134 which is in turn operatively connected to the core extension 54 of solenoid 52. When this solenoid operates in response to the action of the circuit including the photosensitive means, then the pins 130 will move into position to reset the sleeves 88. It will be appreciated that one of the mechanisms 74 will be located in proximity with each solenoid 52. The number and position of lever arms 128 will correspond to the particular light reflecting means necessary to energize the associated solenoid 52. With this arrangement, the levers 128 can each be secured to a common shaft 136 whereby operation of the link 134 will move all of the levers 128 into resetting position.

FIGURE 9 illustrates a typical circuit arrangement for use in combination with the control means of this invention. In the circuit, the photosensitive means 124 are connected to amplifier and relay combinations 136. The particular photosensitive means in any given circuit comprises the photosensitive means situated at any discharge location. The photosensitive means are adapted to complete circuits when energized to thereby operate the relays in the combinations 136. These relays are connected to switches 138 whereby a solenoid 52 can be energized. It will be appreciated that both relays must operate to close both switches in order to energize the solenoid 52. In many instances, individual relays will be energized due to the operation of an associated photosensitive means. However, the solenoid 52 cannot be energized unless all of the photosensitive means included in a particular code combination are simultaneously put into operation.

In the illustrated embodiment, four sleeve members 88 are provided and the following table demonstrates that 15 different combinations can be accomplished with this construction. Thus, the operation of the discharge means at 15 different locations along a conveyor path will be possible.

| Discharge location: | Code combination of reflecting means |
|---|---|
| 1 | 1-2-3-4 |
| 2 | 1-2-3 |
| 3 | 1 -3-4 |
| 4 | 1-2 -4 |
| 5 | -2-3-4 |
| 6 | 1-2 |
| 7 | 1 -3 |
| 8 | 1 -4 |
| 9 | -2-3 |
| 10 | -2 -4 |
| 11 | -3-4 |
| 12 | 1 |
| 13 | -2 |
| 14 | -3 |
| 15 | -4 |

In the above table, the numbers correspond to the same sleeve position in each of the control portions 68. It will be noted that the code combinations involving the greatest number of positions are listed first, and this arrangement is necessary in a system of the type described. Thus, all four of the photosensitive means will be situated at the first discharge location. At the next locations, different combinations of three photosensitive means will be provided. The number of photosensitive means decreases down to the four different available combinations of one photosensitive means. The arrangement shown is necessary since otherwise the lesser number combinations of photosensitive means would be energized by the greater number combinations of light reflecting means if the former were located at the initial stations for discharge.

In a typical system employing the mechanisms of this invention, a pushbutton control board would be located at the entry means 14 for the conveyor. When a particular article is placed on the conveyor, the operator will consider the particular bin to which this article should be directed. Knowing the code of the bin, the operator will operate pushbuttons corresponding to this code. For example, if the article were to be directed to the first bin, the operator would push all four buttons so that each solenoid 114 would pivot to cause each of the sleeves 88 to rotate to a reflecting position. The operator can correlate the placing of an article on a tray with the switches so that the sleeves associated with a particular tray will be rotated in accordance with the desired location of discharge of the particular article.

The article deposited on a tray will proceed in accordance with the driving movement of the conveyor. It will be noted that the device of this invention operates completely independently of the speed of the conveyor, and the conveyor can be started and stopped without in any way effecting the control means.

When the trays carrying the article reaches the desired location, the photosensitive means at this location will correspond precisely to the reflecting means positioned at the time the article was placed on the tray. In the first phase of the discharge operation, the photosensitive means will operate due to the reflecting characteristics of the light reflecting members 100. Thereafter, the switches 138 at the desired location will operate to thereby cause the solenoid 52 to pivot cam means 58 into engagement with wheel 48. At the same time, the solenoid 52 will pivot lever 128 so that further progress of the mechanism 68 will cause the sleeves to be rotated to a nonreflecting position.

It will be understood that two sets of photosensitive means could be located at each discharge station with cam means and solenoids 52 situated on either side of the conveyor path. Since the trays can be tilted in either direction, a more versatile operation will result with this type of arrangement.

With regard to the means for initiating setting the codes, it will be understood that energization of solenoids 114 can be accomplished automatically rather than through the use of individual switches associated with each solenoid. An automatic system may involve an operation such as described in applicants' copending application Serial No. 210,669, entitled "Memory Apparatus." On the other hand, the lever arms could be operated manually.

The use of light reflecting means and photosensitive means is particularly desirable due to the reliability of such system. It will be understood, however, that the mechanical arrangements described could be employed in combination with other code carrying and code reading systems. For example, the members 100 could comprise magnetic means while the reading means could comprise devices sensitive to the presence of a magnetic field.

It will be understood that various changes and modifications may be made in the above described apparatus which provide the characteristics of this invention without departing from the spirit thereof particularly as defined in the following claims.

That which is claimed is:

1. In a conveyor apparatus which includes a plurality of carriage means secured to the conveyor for travel therewith, said carriage means comprising tiltable trays which are adapted to be tilted for discharge of articles to at least one side of the conveyor along the path of movement thereof, and including tray tilting means movable into the path of said trays to effect tilting thereof for the discharge of articles from the trays, and including mechanisms associated with the carriage means and cooperating mechanisms associated with the conveyor for operating on the carriage means whereby articles can be discharged from the carriage means, the improvement comprising control means for automatically operating said discharge mechanisms whereby the mechanisms can be selectively operated at varying locations along the path of travel of their associated carriage means, said control means including a plurality of code retaining members comprising light reflecting surfaces secured to the conveyor with sets of said code retaining members being associated with individual carriage means, code reading means located at said locations along the path of travel of said carriage means, means for selectively positioning different combinations of said code retaining means for individual carriage means, and said code reading means being arranged in different combinations at said locations, said code reading means being adapted to actuate said control means when a combination of any of said code retaining means corresponds to the combination of said code reading means at any one of said locations, and wherein said light reflecting surfaces comprise plates mounted on rotary members, means adapted to engage individual ones of said rotary members for causing rotation of said members to thereby shift said plates from a non reflecting to reflecting position, said engaging means being individually operable whereby different combinations of said light reflecting surfaces can be shifted to a reflecting position.

2. An apparatus in accordance with claim 1 wherein said engaging means comprise pins, levers carrying said pins, and solenoids adapted to pivot said levers for movement into the path of said rotary means, said rotary means defining slotted corners dimensioned to receive said pins.

3. An apparatus in accordance with claim 2 wherein a plurality of said plates are mounted on each rotary member with nonreflecting areas defined between said plates, and wherein engagement of said corners by said pins rotates said members to shift said members from a nonreflecting to a reflecting position.

4. An apparatus in accordance with claim 3 including restoring means situated at each of said stations for moving said reflecting surfaces to a nonreflecting position after the photosensitive means actuate said control means, said means being operatively connected to said tray tilting means, and wherein said restoring means comprise pins adapted to be pivoted into the path of movement of said rotary members due to movement of said tilting means, and wherein the restoring pins at any location correspond to the combination of light reflecting surfaces necessary to operate the tilting means at this station.

References Cited by the Examiner

UNITED STATES PATENTS

| 3,080,985 | 3/1963 | Rabinow | 198—38 |
| 3,144,926 | 8/1964 | Edelman | 198—38 |
| 3,167,192 | 1/1965 | Harrison | 198—38 |
| 3,168,053 | 2/1965 | Miroux | 104—88 |
| 3,171,362 | 3/1965 | Noye | 104—88 |

EVON C. BLUNK, *Primary Examiner.*

RICHARD E. AEGERTER, MARVIN A. CHAMPION,
*Examiners.*